United States Patent Office 3,052,672
Patented Sept. 4, 1962

3,052,672
NOVEL ESTRADIENES AND PREPARATION THEREOF
Gerard Nomine, Noisy-le-Sec, Robert Bucourt, Villiers-le-Bel, and Michel Vignau, Neuilly-sur-Seine, France, assignors, by mesne assignments, to Roussel-UCLAF, S.A., Paris, France, a corporation of France
No Drawing. Filed July 17, 1961, Ser. No. 124,317
Claims priority, application France July 29, 1960
8 Claims. (Cl. 260—239.5)

The invention relates to novel estradienes having the formula

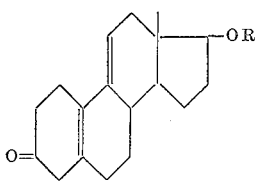

(I)

wherein R is selected from the group consisting of hydrogen and an acyl radical of an organic carboxylic acid having 1 to 18 carbon atoms. The invention further relates to novel processes for the preparation of said estradienes and the intermediates thereof.

The estradienes of Formula I have interesting pharmacological properties, and are particularly useful as anabolisants. The said estradienes are also useful intermediates for the preparation of $\Delta^{4(5),9(10)}$-estradiene-17$\beta$-ol-3-one and its esters which are used to prepare estradiol by isomerization as disclosed in the commonly-assigned, copending U.S. application Serial No. 57,136 filed September 20, 1960.

It is an object of the invention to provide the novel steroids, $\Delta^{5(10),9(11)}$-estradiene-17$\beta$-ol-3-one and its esters.

It is another object of the invention to provide novel processes for the preparation of the novel estradienes of Formula I.

It is an additional object of the invention to provide novel intermediates for the novel estradienes of Formula I.

It is a further object of the invention to provide an improved process for the preparation of $\Delta^{4(5),9(10)}$-estradiene-17$\beta$-ol-3-one and its esters.

These and other objects and advantages of the invention will become obvious from the following detailed description.

The novel compounds of the invention have the formula

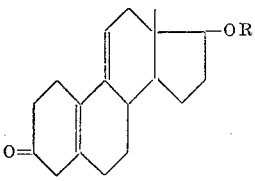

(I)

wherein R is selected from the group consisting of hydrogen and an acyl radical of an organic carboxylic acid having 1 to 18 carbon atoms.

The organic carboxylic acid having 1 to 18 carbon atoms may be aliphatic, aromatic or cycloaliphatic. Suitable organic carboxylic acids are alkanoic or alkenoic acids such as acetic acid, trimethyl acetic acid, propionic acid, 4,4-dimethyl pentanoic acid, 10-undecenoic acid; cycloalkylalkanoic acids such as $\beta$-cyclopentyl propionic acid; aryl alkanoic acids such as phenyl propionic acid; cycloalkanoic acids such as hexahydrobenzoic acid and hexahydroterephthalic acid; and phenyl carboxylic acids such as benzoic acid and 3,5-dinitrobenzoic acid.

One process for the preparation of compounds of Formula I comprises reacting a secondary amine having the formula

(II)

wherein $R^1$ and $R^{11}$ are lower alkyl and when taken together with the nitrogen atom are selected from the group consisting of pyrrolidino, piperidyl and morpholino with a compound having the formula

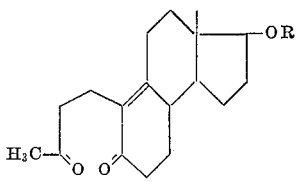

(III)

wherein R has the above definition to form a 3-enamine having the formula

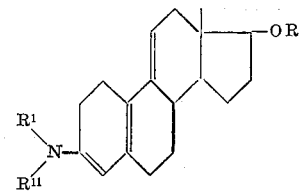

(IV)

wherein R, $R^1$ and $R^{11}$ have the above definition, hydrolyzing the latter a short time with a weak lower alkanoic acid such as acetic acid or propionic acid to form a 17$\beta$-oxygenated-$\Delta^{5(10),9(11)}$-estradiene-3-one of Formula I and recovering the latter. The compounds of Formula I may then be isomerized with strong mineral acids to form $\Delta^{4(5),9(10)}$-estradiene-17$\beta$-ol-3-one or its esters.

Another process for the preparation of the estradienes of Formula I comprises reacting a compound of the formula

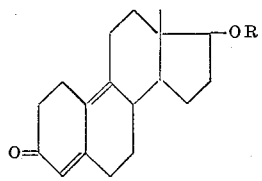

(V)

wherein R has the above definition, prepared according to copending U.S. application Serial No. 57,136, with a secondary amine of Formula II to form the corresponding 3-enamino-17$\beta$-oxygenated-$\Delta^{3,5(10),9(11)}$-estratriene of Formula IV, hydrolyzing the latter a short time with a weak alkanoic acid to form the corresponding 17$\beta$-oxygenated-$\Delta^{5(10),9(11)}$-estradiene-3-one of Formula I and recovering the latter.

The improved process for the preparation of 17$\beta$-oxygenated-$\Delta^{4(5),9(10)}$-estradiene-3-ones of Formula V comprises reacting a compound of Formula III with a secondary amine of Formula II to form a 3-enamino-17$\beta$-oxygenated-$\Delta^{3,5(10),9(11)}$-estratriene of Formula IV, reacting the latter a prolonged time with acetic acid. The reaction schemes of the invention are illustrated in Table I.

TABLE I

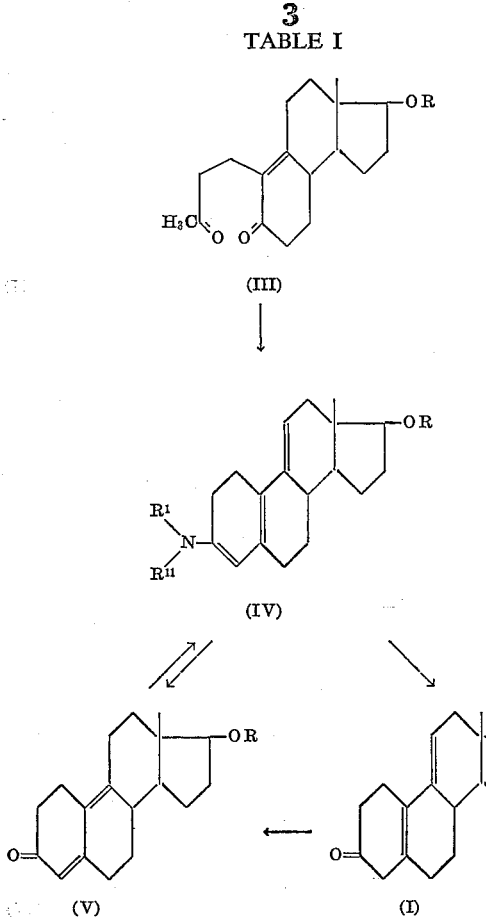

wherein R is selected from the group consisting of hydrogen and an acyl radical of an organic carboxylic acid having 1 to 18 carbon atoms and $R^1$ and $R^{11}$ may be lower alkyl and when taken together are selected from the group consisting of pyrrolidyl, piperidyl and morpholino.

The compounds of Formula III are 3-methyl-7-oxo-8-(3' - oxobutyl) - 3,4 - (3' - benzoyloxy - 1',2' - cyclopentano) - $\Delta^{8(9)}$ - octahydronaphthalenes and may be prepared as described in commonly-assigned, copending application Serial No. 36,171 filed June 15, 1960, now U.S. Patent No. 3,019,252.

In the following examples there are described several preferred embodiments to illustrate the invention. However, it should be understood that the invention is not intended to be limited to the specific embodiments.

EXAMPLE I

*Preparation of 17β-Benzoyloxy-$\Delta^{5(10),9(11)}$-Estradiene-3-One*

Step A: *Preparation of 17β-benzoyloxy-3-pyrrolidino-$\Delta^{3,5(10),9(11)}$-estratriene.*—There was heated to the boiling point for a period of 4 minutes a mixture of 10 cc. of pure methanol, 1 gm. of 3β-methyl-7-oxo-8β-(3'-oxo-butyl) - 3α,4β - (3' - benzoyloxy - 1',2' - cyclopentano)- $\Delta^{8(9)}$ - octahydronaphthalene and 1 cc. of pyrrolidine. The reaction was allowed to remain overnight at room temperature and cooled for about 1 more hour in a refrigerator before vacuum filtering. After vacuum filtering, washing with iced methanol and drying, 980 mg. (being a yield of 90%) of 17β-benzoyloxy-3-pyrrolidino-$\Delta^{3,5(10),9(11)}$-estratriene were obtained, sufficiently pure for its use in step B.

For analysis, the product was recrystallized by dissolution in lukewarm benzene and methanol added thereto. After drying, the product had a melting point of 148° C. and a specific rotation $[\alpha]_D^{20}=+261°$ (c.=0.72% in benzene).

The ultraviolet spectra determined in ether showed:

$\lambda_{max.}$ 228 m$\mu$ ($\epsilon$=26,500)
Others $\lambda_{max.}$ at 273,280 and 297 m$\mu$ and $\lambda_{max.}$ 348 m$\mu$ ($\epsilon$=23,000).

The clear yellow product was soluble in 3 volumes of lukewarm benzene, slightly soluble in methanol and in ether.

*Analysis.*—$C_{29}H_{35}O_2N$; molecular weight=429.58. Calculated: C, 81.07%; H, 8.21%; N, 3.26%. Found: C, 80.9%; H, 8.2%; N, 3.2%.

This compound is not described in the literature.

Step B: *Preparation of 17β-benzoyloxy-$\Delta^{5(10),9(11)}$-estradiene-3-one.*—(a) 0.68 of the compound prepared in step A were dissolved in 0.68 cc. of pure acetic acid under agitation as rapidly as possible. After the product was dissolved, 6.8 cc. of distilled water were immediately added. Crystallization of 17β-benzoyloxy-$\Delta^{5(10),9(11)}$-estradiene-3-one commenced very soon. The mixture was allowed to stand for a quarter of an hour at room temperature and the precipitate formed was vacuum filtered, washed with water and dried. The raw precipitate obtained was purified by recrystallization from boiling acetone. The product had a melting point of 173–174° C., and a specific rotation $[\alpha]_D^{20}=+106.4°$ (c.=1% in chloroform). A second recrystallization from acetone or isopropyl ether did not change the melting point.

The ultraviolet spectra determined in ethanol shows:

$\lambda_{max.}$ 234 m$\mu$ ($\epsilon$=31,550)
$\lambda_{max.}$ 280 m$\mu$ ($\epsilon$=920)

The product was soluble in warm acetone and in warm isopropyl ether, and insoluble in water.

Its infrared spectra confirm the absence of conjugated ketone function and the presence of the benzoate function.

*Analysis.*—$C_{25}H_{28}O_3$; molecular weight=376.5. Calculated: C, 79.75%; H, 7.5%. Found: C, 79.5%; H, 7.6%.

This compound is not described in the literature.

$\Delta^{5(10),9(11)}$-estradiene-17β-ol-3-one is obtained by the same set of reactions.

EXAMPLE II

*Preparation of 17β-Benzoyloxy-$\Delta^{4,9(10)}$-Estradiene-3-One*

0.7 gm. of 17β-benzoyloxy-3-pyrrolidino-$\Delta^{3,5(10),9(11)}$-estratriene were dissolved in 0.7 cc. of acetic acid and the reaction mixture allowed to stand at 20–25° C. for a period of 30 minutes. 7 cc. of distilled water were added and the reaction mixture allowed to stand for a quarter of an hour. A small quantity of product was separated and was vacuum filtered and washed with water. It represented 50 mg. (an 8% yield) of 17β-benzoyloxy-$\Delta^{5(10),9(11)}$-estradiene-3-one.

The filtration liquors and the wash liquor were combined and brought to a pH of 9 by slow addition of sodium hydroxide solution under agitation. An abundant precipitate was formed which was vacuum filtered, washed with water and dried. 530 mg. (a yield of 87%) of 17-β-benzoyloxy-$\Delta^{4,9(10)}$-estradiene-3-one were obtained which was purified by recrystallization from acetone. The product had a melting point of 163–164° C., and did not give a depression of the melting point when mixed with 17β-benzoyloxy-$\Delta^{4,9(10)}$-estradiene-3-one obtained starting from 17-benzoyloxy-19-nor-$\Delta^{8(9)}$-androstene-5-ol-3-one.

By heating with methanolic pyrrolidine, 17β-benzoyloxy-$\Delta^{4,9(10)}$-estradiene-3-one furnished 17β-benzoyloxy-3-pyrrolidino-$\Delta^{3,5(10),9(11)}$-estratriene described in step 1 of the example.

EXAMPLE III

*Isomerization of 17β-Benzoyloxy-Δ$^{5(10),9(11)}$-Estradiene-3-One Into 17β-Benzoyloxy-Δ$^{4(5),9(10)}$-Estradiene-3-One*

1 gm. of 17β-benzoyloxy-Δ$^{5(10),9(11)}$-estradiene-3-one was dissolved in 30 cc. of acetic acid containing 10% of perchloric acid (27 cc. of acetic acid plus 3 cc. of 63% perchloric acid) and the solution was allowed to stand for a period of 30 minutes at a temperature of 25° C. After the addition of 300 cc. of water, a gummy product was obtained which was extracted three times with 50 cc. of methylene chloride. The organic phases were combined, washed with 20 cc. of a saturated solution of sodium bicarbonate then twice with 100 cc. of water until the wash waters were neutral. The product remaining was dried. A gum was obtained which was made to crystallize by the addition of 2 cc. of isopropyl ether. The solution was cooled 15 minutes and vacuum filtered. The precipitate was washed twice with 2 cc. of cold isopropyl ether. 17β-benzoyloxy-Δ$^{4(5),9(10)}$-estradiene-3-one melting at 163–164° C. was obtained with an almost quantitative yield.

Various modifications of the processes of the present invention may be made without departing from the spirit or scope thereof, and it is to be understood that the invention be limited only as defined in the appended claims.

We claim:

1. A compound having the formula

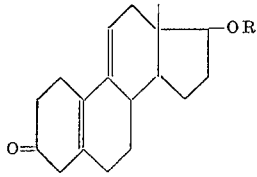

wherein R is selected from the group consisting of hydrogen and an acyl radical of an organic carboxylic acid having 1 to 18 carbon atoms.

2. 17β-benzoyloxy-Δ$^{5(10),9(11)}$-estradiene-3-one.

3. Δ$^{5(10),9(11)}$-estradiene-17β-ol-3-one.

4. A process for the preparation of a 17β-oxygenated-Δ$^{5(10),9(11)}$-estradiene-3-one having the formula

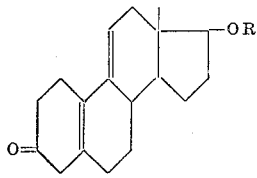

wherein R is selected from the group consisting of hydrogen and an acyl radical of an organic carboxylic acid having 1 to 18 carbon atoms which comprises reacting a secondary amine selected from the group consisting of di-lower alkyl amines, pyrolidine, piperidine and morpholine and a compound having the formula

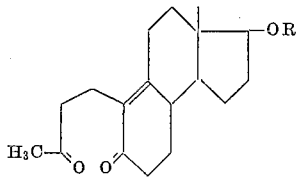

wherein R has the above definition to form the corresponding 3-enamino-17β-oxygenated-Δ$^{3,5(10),9(11)}$-estratriene having the formula

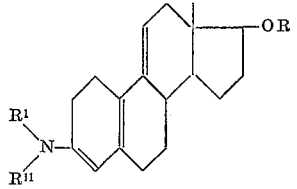

wherein R has the above definition and R$^1$ and R$^{11}$ are lower alkyl and when taken together with the nitrogen atom are selected from the group consisting of pyrrolidino, piperidino and morpholino, hydrolyzing the latter a short time with a lower alkanoic acid to the said 17β-oxygenated-Δ$^{5(10),9(11)}$-estradiene-3-one and recovering the latter.

5. The process of claim 4 wherein the lower alkanoic acid is acetic acid.

6. The process of claim 4 wherein the secondary amine is pyrrolidine and R is a benzoyloxy radical.

7. A compound having the formula

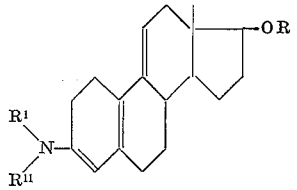

wherein R is selected from the group consisting of hydrogen and an acyl radical of an organic carboxylic acid having 1 to 18 carbon atoms and R$^1$ and R$^{11}$ are lower alkyl and when taken together with the nitrogen atom are selected from the group consisting of pyrrolidino, piperidino, morpholino.

8. 17β-benzoyloxy-3-pyrrolidino - Δ$^{3,5(10),9(11)}$ - estratriene.

References Cited in the file of this patent

UNITED STATES PATENTS 2,793,218  Herr _____ May 21, 1957